United States Patent
Tobari et al.

(10) Patent No.: US 12,334,847 B2
(45) Date of Patent: Jun. 17, 2025

(54) POWER CONVERTER APPARATUS

(71) Applicant: Hitachi Industrial Equipment Systems Co., Ltd., Tokyo (JP)

(72) Inventors: Kazuaki Tobari, Tokyo (JP); Hironori Ohashi, Tokyo (JP); Hiroshi Watanabe, Tokyo (JP); Masato Ohya, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 18/273,844

(22) PCT Filed: Nov. 10, 2021

(86) PCT No.: PCT/JP2021/041409
§ 371 (c)(1),
(2) Date: Jul. 24, 2023

(87) PCT Pub. No.: WO2023/276181
PCT Pub. Date: Jan. 5, 2023

(65) Prior Publication Data
US 2024/0079982 A1    Mar. 7, 2024

(30) Foreign Application Priority Data

Jun. 29, 2021    (JP) .................... 2021-107665

(51) Int. Cl.
*H02P 21/26* (2016.01)
*H02P 21/14* (2016.01)
*H02P 21/22* (2016.01)

(52) U.S. Cl.
CPC ............ *H02P 21/26* (2016.02); *H02P 21/141* (2013.01); *H02P 21/22* (2016.02)

(58) Field of Classification Search
CPC ........ H02P 21/26; H02P 21/141; H02P 21/22; H02P 21/0014; H02P 21/05; H02P 21/18
See application file for complete search history.

(56) References Cited

U.S. PATENT DOCUMENTS 9,525,376 B2    12/2016    Box
2009/0267546 A1*  10/2009    Maekawa ............... H02P 21/14
                                                318/400.02
(Continued)

FOREIGN PATENT DOCUMENTS

JP    2003-199390 A    7/2003
JP    2009-17676 A     1/2009
(Continued)

OTHER PUBLICATIONS

International Search Report (PCT/ISA/210) issued in PCT Application No. PCT/JP2021/041409 dated Jan. 18, 2022 with English translation (4 pages).

(Continued)

*Primary Examiner* — Bickey Dhakal
(74) *Attorney, Agent, or Firm* — Crowell & Moring LLP

(57) ABSTRACT

A power converter apparatus comprising: a power converter that outputs signal to the magnet motor to vary the output frequency, output voltage and output current of the magnet motor, a control unit controls the power converter, wherein the control unit calculating the gain of the magnetic flux component of the q-axis, which varies with the phase of the magnet motor, calculating the d-axis induced voltage command value based on a value of the induced voltage coefficient, frequency estimates or frequency command value, and the gain of the flux component of the q-axis.

8 Claims, 14 Drawing Sheets

(56) References Cited

U.S. PATENT DOCUMENTS

| | | | |
|---|---|---|---|
| 2011/0175556 A1* | 7/2011 | Tobari | H02P 21/05 |
| | | | 318/400.23 |
| 2018/0248501 A1 | 8/2018 | Hoshino et al. | |
| 2021/0152113 A1 | 5/2021 | Tobari et al. | |
| 2022/0224268 A1* | 7/2022 | Saeki | H02P 21/141 |

FOREIGN PATENT DOCUMENTS

| | | | |
|---|---|---|---|
| JP | 2014-166082 A | 9/2014 | |
| JP | 2016-201911 A | 12/2016 | |
| JP | 2020-5404 A | 1/2020 | |

OTHER PUBLICATIONS

Japanese-language Written Opinion (PCT/ISA/237) issued in PCT Application No. PCT/JP2021/041409 dated Jan. 18, 2022 (4 pages).
Extended European Search Report issued in European Application No. 21948484.7 dated Mar. 14, 2025 (8 pages).

* cited by examiner

POWER CONVERTER APPARATUS

TECHNICAL FIELD

This invention relates to a power converter apparatus.

BACKGROUND ART

When the magnet motor induced voltage has superimposed 5th and 7th order components of the fundamental frequency, the controller's memory stores magnet motor induced voltage data, and based on the angular frequency $\omega$ and rotation position $\theta$, d-axis and q-axis induced voltage command values are generated based on the angular frequency $\omega$ and rotational position $\theta$, and the control technique to make the current sinusoidal is described in Patent Document 1.

CITATION LIST

Patent Document

Patent Documents 1 Patent Publication No. 2003-199390

SUMMARY OF THE INVENTION

Problems to be Solved by the Invention

In Patent Document 1, it is necessary to store magnet motor induced voltage data in the controller's memory. However, when the induced voltage is a square wave, current pulsation due to odd components (11th, 13th, 17th, 19th, 23rd, 25th . . . ) excluding multiples of 3 of the harmonic components may occur. The generation of current pulsation is possible.

The purpose of this invention is to provide a power converter apparatus that makes the magnet motor current sinusoidal without having induced voltage data.

One preferred example of the invention is a power converter apparatus comprising a power converter that outputs signal to the magnet motor to vary the output frequency, output voltage and output current of the magnet motor, a control unit controls the power converter, wherein the control unit calculating the gain of the magnetic flux component of the q-axis, which varies with the phase of the magnet motor, calculating the d-axis induced voltage command value based on a value of the induced voltage coefficient, frequency estimates or frequency command value, and the gain of the flux component of the q-axis.

Effects of the Invention

According to this invention, the current of magnet motor can be sinusoidal without having induced voltage data.

MODE FOR CARRYING OUT THE INVENTION

The following drawings are used to explain this example in detail. The same reference numbers are used for common configurations in each figure. The examples described below are not limited to the illustrated examples.

EXAMPLE 1

Figure 1:
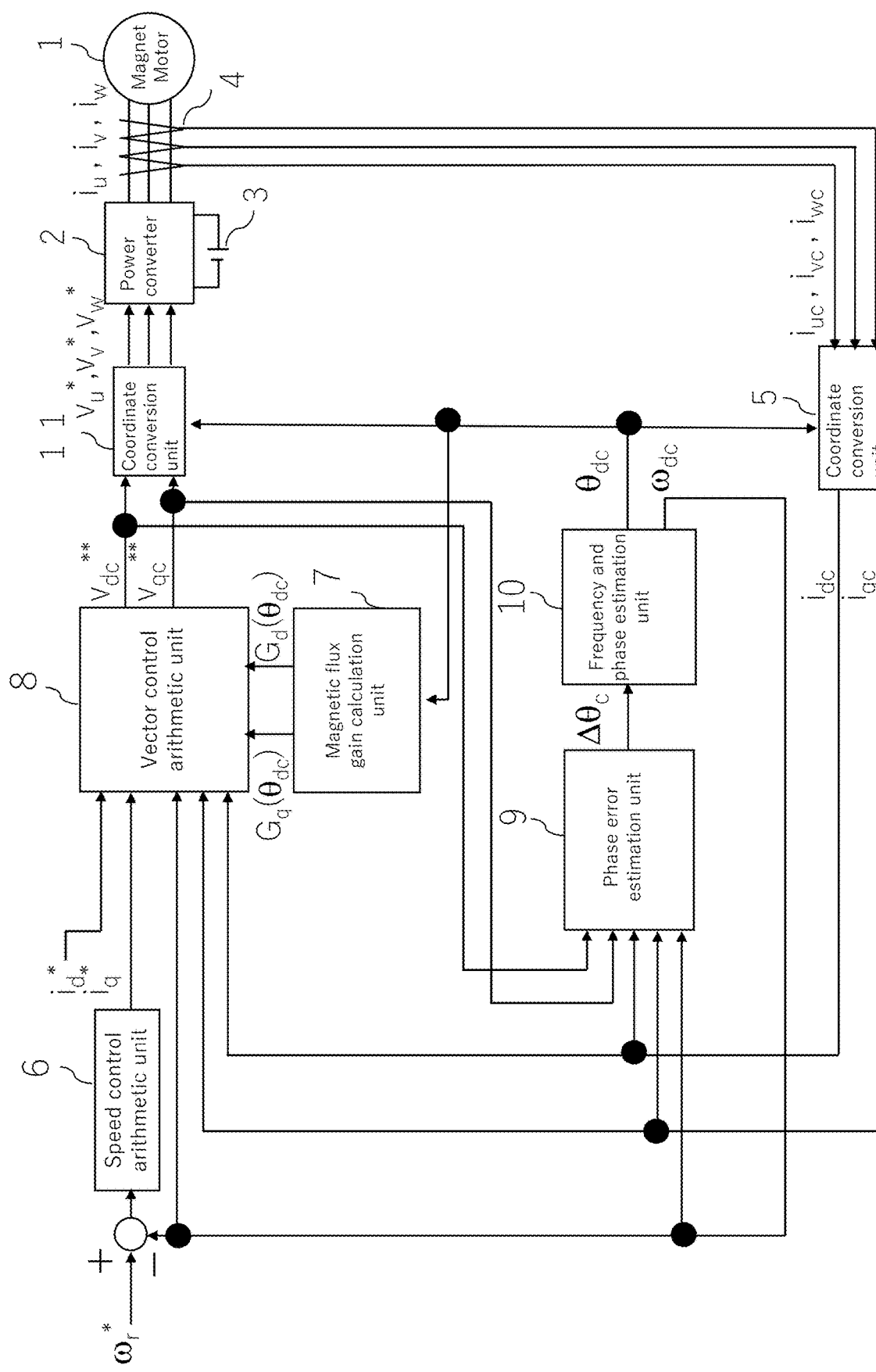
FIG. 1: System configuration diagram of the power converter apparatus and other equipment in Example 1.

FIG. 1 shows a system configuration diagram with power converter apparatus and magnet motor in Example 1.

Magnet motor 1 outputs motor torque that is a composite of the torque component due to the magnetic flux of the permanent magnet and the torque component due to the inductance of the armature winding.

Power converter 2 is equipped with semiconductor devices as switching elements. Power converter 2 inputs 3-phase AC voltage command value $v_u^*$, $v_v^*$, $v_w^*$ and outputs voltage values proportional to 3-phase AC voltage command value $v_u^*$, $v_v^*$, $v_w^*$ based on the output of power converter 2, magnet motor 1 is driven, and the output voltage value, output frequency value, and output current value of magnet motor 1 are controlled variably. IGBT (Insulated gate bipolar transistor) may be used as switching elements.

DC power supply 3 supplies DC voltage and DC current to power converter 2.

The current detector 4 outputs $i_{uc}$, $i_{vc}$, and $i_{wc}$, which are the detected values of the alternating current $i_u$, $i_v$, and $i_w$ of the three phase magnet motor 1. The current detector 4 detects the alternating current of two of the three phase magnet motor 1, for example, phase u and phase w. The alternating current of phase v may be calculated from the AC condition ($i_u+i_v+i_w=0$) to be $i_v=-(i_u+i_w)$.

In this example, the current detector 4 is shown in the power converter apparatus, but it can also be located outside the power converter apparatus.

The control unit is equipped with a coordinate conversion unit 5, speed control arithmetic unit 6, magnetic flux gain calculation unit 7, vector control arithmetic unit 8, phase error estimation unit 9, frequency and phase estimation 10, and coordinate conversion unit 11 described below. Unit 8, phase error estimation unit 9, frequency and phase estimation 10, and coordinate conversion unit 11.

The control unit controls the output of power converter 2 so that the output voltage value, output frequency value, and output current of magnet motor 1 are controlled variably.

The control unit is composed of microcomputers and semiconductor integrated circuits (arithmetic and control means) such as DSP (digital signal processor), etc. Any or all of the control unit can be composed of hardware such as ASIC (Application Specific Integrated Circuit) and FPGA (Field Programmable Gate Array).

The CPU (Central Processing Unit) of the control unit reads the program stored in the memory or other recording device and executes the processing of each part of the coordinate conversion unit 5 and other parts described above.

Next, each component of the control unit is explained. Coordinate conversion unit 5 outputs current sense values $i_{dc}$ and $i_{qc}$ for the d- and q-axes from the three-phase alternating current $i_u$, $i_v$, $i_w$ detection values $i_{uc}$, $i_{vc}$, $i_{wc}$ and phase estimate value $\theta_{dc}$.

The speed control arithmetic unit 6 calculates the torque command value $\tau^*$ based on the frequency command value $\omega_r^*$ and frequency estimates $\omega_{dc}$ and divides it by the torque coefficient to output the q-axis current command value $i_q^*$ The magnetic flux gain calculation unit 7 outputs the gains $G_d(q_{dc})$ and $G_q(q_{dc})$ of the d-axis and q-axis magnetic flux components that vary with phase based on the phase estimate value $\theta_{dc}$ The vector control arithmetic unit 8 outputs current command value $i_d^*$, $i_q^*$, current sense value $i_{dc}$, $i_{qc}$, frequency estimates $\omega_{dc}$ of the d-axis and q-axis, the electrical circuit parameters of magnet motor 1 and voltage command value $v_{dc}^{}$ and $v_{qc}^{}$ are calculated based on the gains $G_d(q_{dc})$ and $G_q(q_{dc})$ of the magnetic flux components of the q-axis and d-axis.

The phase error estimation unit 9 outputs the estimated phase error $\Delta\theta_c$, which is the deviation between the phase estimate value $\theta_{dc}$, which is the phase of the control, and the phase $\theta_d$ of the magnet motor 1 by using the control axis d-axis and q-axis voltage command value $v_{dc}^{}$, $v_{qc}^{}$, frequency estimates $\omega_{dc}$, current sense value $i_{dc}$, $i_{qc}$ and electrical circuit parameters of magnet motor 1.

The frequency and phase estimation 10 outputs the frequency estimate $\omega_{dc}$ and phase estimate value $\theta_{dc}$ based on the phase error estimates $\Delta\theta_c$ Coordinate conversion unit 11 outputs 3-phase AC voltage command value $v_u^*$, $v_v^*$, and $v_w^*$ from d-axis and q-axis voltage command value $v_{dc}^{}$ and $v_{qc}^{}$ and phase estimate value $\theta_{dc}$.

First, the basic operation of the sensor-less vector control system when using the magnetic flux gain calculation unit 7, which is a feature of this example is described.

The speed control arithmetic unit 6 calculates the torque command $\tau^*$ and the current command value $i_q^*$ of the q-axis according to Formula 1 by proportional and integral control so that the frequency estimates $\omega_{dc}$ follow the frequency command value $\omega_r^*$.

[Formula 1]

$$\tau^* = (\omega_r^* - \omega_{dc})\left(K_{sp} + \frac{K_{si}}{s}\right)$$
$$i_q^* = \frac{\tau^*}{3/2 P_m [K_e^* + (L_d^* - L_q^*)i_d^*]}$$ (1)

WHEREAS, $K_{sp}$: proportional gain of speed control, $K_{si}$: integral gain of speed control, $P_m$: polar logarithm, $K_e$: Induced voltage coefficient, $L_d$: d-axis inductance, $L_q$: q-axis inductance,

*:set value, s is Laplace operator

The magnetic flux gain calculation unit 7 and vector control arithmetic unit 8 in FIG. 1 are explained.

Figure 2:
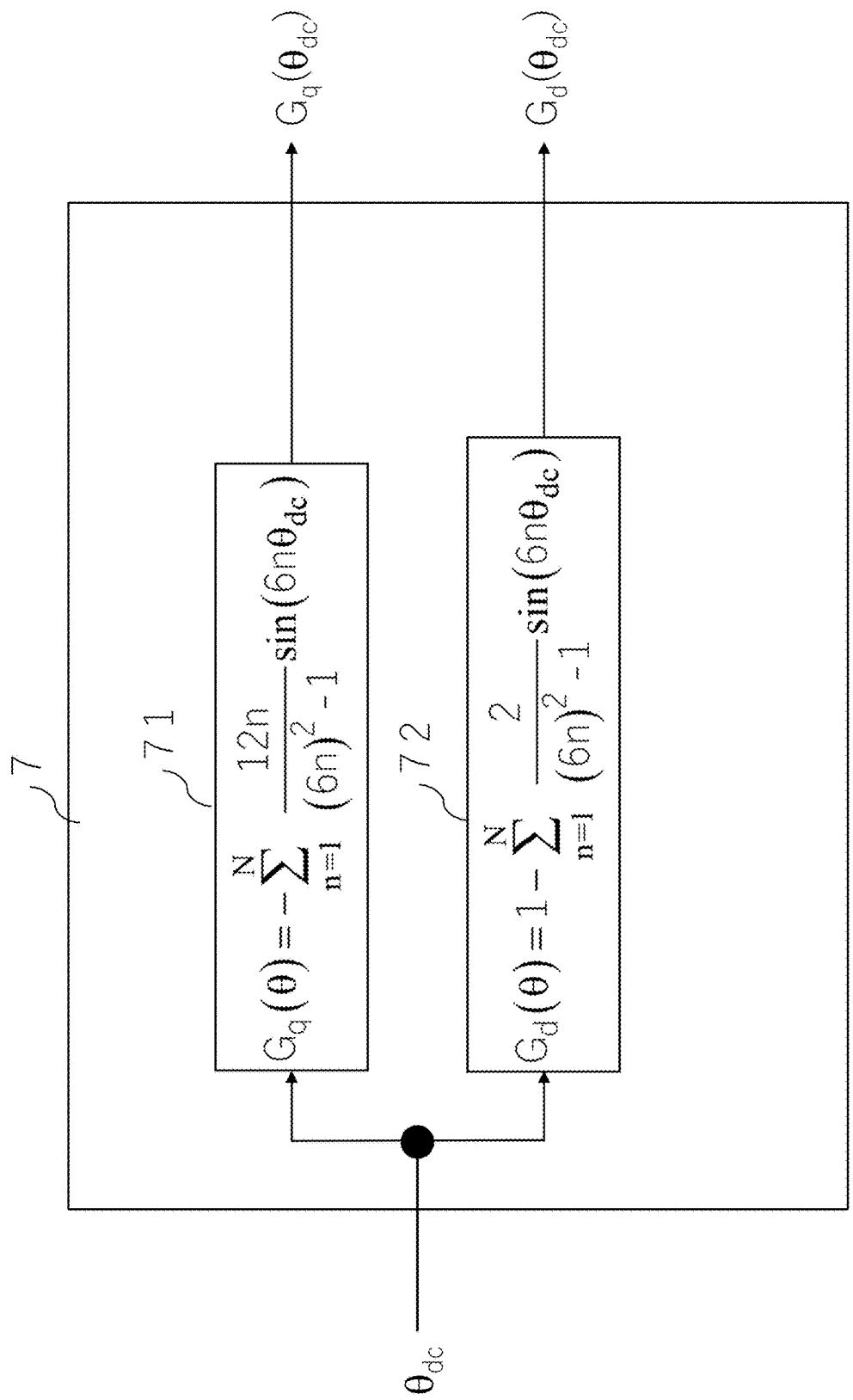
FIG. 2: Configuration diagram of the magnetic flux gain calculation unit in Example 1.

FIG. 2 shows the block diagram of the magnetic flux gain calculation unit 7, which consists of the q-axis magnetic flux gain calculation unit 71 and the d-axis magnetic flux gain calculation unit 72, flux gain calculation unit 72 for the d-axis.

The q-axis magnetic flux gain calculation unit 71 calculates the sine function of the phase estimate according to Formula 2 using the phase estimate value $\theta_{dc}$ and outputs the q-axis magnetic flux gain $G_q(\theta_{dc})$.

[Formula 2]

$$G_q(\theta_{dc}) = -\sum_{n=1}^{N} \frac{12n}{(6n)^2 - 1}\sin(6n\theta_{dc})$$ (2)

The magnetic flux gain calculation unit 72 of d-axis calculates the sine function of the phase estimate according to Formula 3 using the phase estimate value $\theta_{dc}$ and outputs the magnetic flux gain $G_d(\theta_{dc})$ of d-axis. N is the order and a natural number.

[Formula 3]

$$G_d(\theta_{dc}) = 1 - \sum_{n=1}^{N} \frac{2}{(6n)^2 - 1}\sin(6n\theta_{dc})$$ (3)

Figure 3:
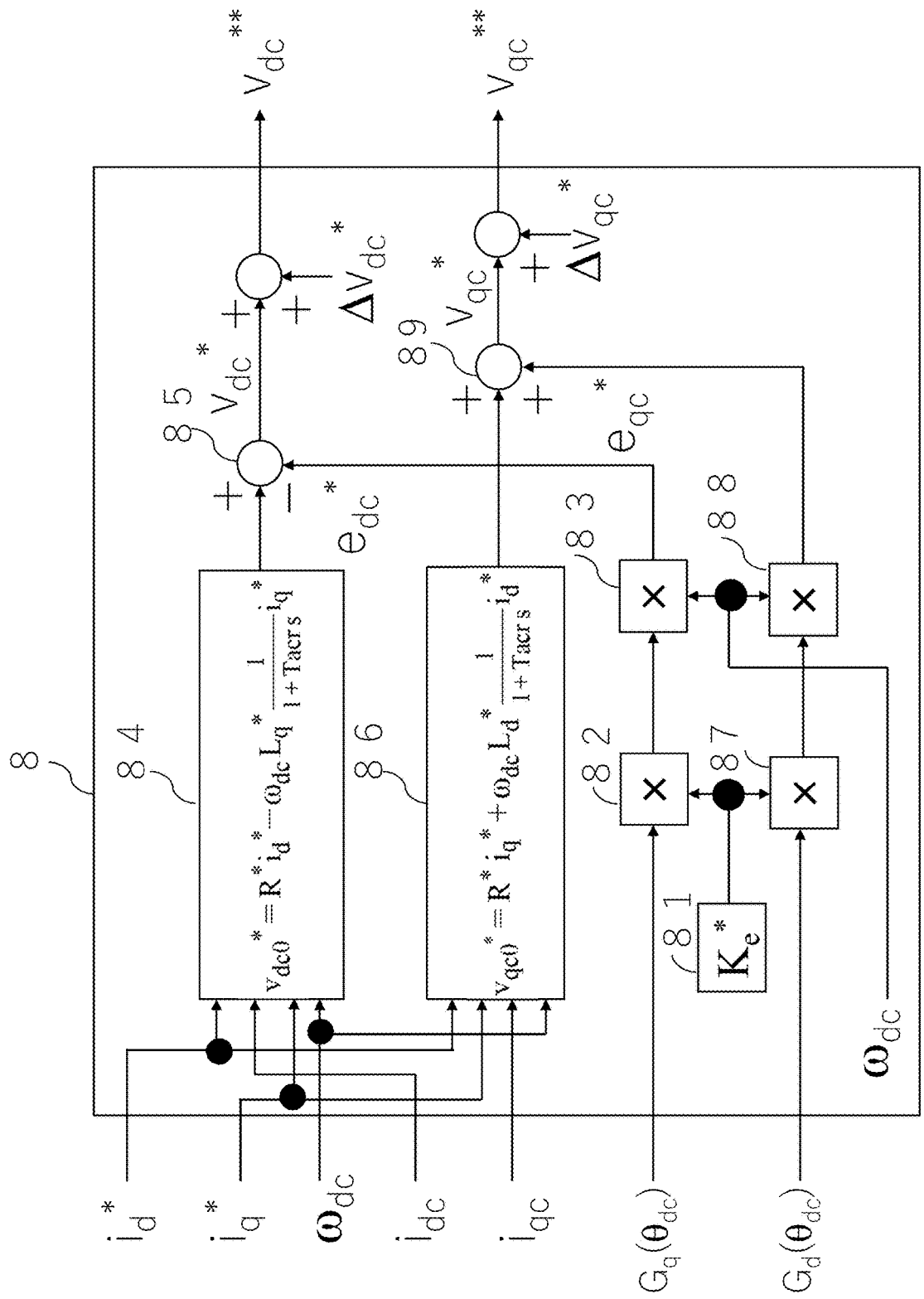
FIG. 3: Configuration diagram of the vector control arithmetic unit in Example 1.

FIG. 3 shows the block diagram of vector control arithmetic unit 8. First, the d-axis voltage command value of vector control arithmetic unit 8 is explained.

The permanent magnet motor 1 induced voltage coefficient $K_e^*$ 81 and q-axis magnetic flux gain $G_q(\theta_{dc})$ are input to multiplier 82.

The output of multiplier 82 is input to multiplier 83 together with frequency estimates $\omega_{dc}$ and its output is d-axis induced voltage command value $e_{dc}^*$ shown in Formula 4.

Here, frequency estimates $\omega_{dc}$ is used as the input to multiplier 83, but it can be modified so that instead of frequency estimates $\omega_{dc}$, frequency command value $\omega_r^*$ is used as the input to multiplier 83 and multiplied with the output of multiplier 82.

[Formula 4]

$$e_{dc}^* = \omega_{dc} K_e^* G_q(\theta_{dc})$$ (4)

The induced voltage coefficient $K_e^*$ 81 is a constant value and is not a data such as induced voltage that varies with rotational position. In addition, the calculation section 84 calculates d-axis voltage command value $v_{dc0}^*$ according to Formula 5 by using the electrical circuit parameters of the permanent magnet motor 1, such as the set value of winding resistance $R^*$, the set value of q-axis inductance $L_q^*$, the d-axis current command value $i_d^*$, the q-axis current command value $i_q^*$, frequency estimates $\omega_{dc}$.

The output $v_{dc0}^*$ of arithmetic unit 84 is input to adder 85 together with the d-axis induced voltage command value $e_{dc}^*$, and the output of adder 85 is the d-axis voltage command value reference value $v_{dc}^*$ shown in Formula 6.

[Equation 5]

$$v_{dc0}^* = R^* i_d^* - \omega_{dc} L_q^* \frac{1}{1 + Tacrs} i_q^*$$ (5)

-continued

[Formula 6]

$$v_{dc}^* = v_{dc0}^* - e_{dc}^* \quad (6)$$

where $T_{acr}$: Response time constant of current control

Second, the q-axis voltage command value of vector control arithmetic unit 8 is explained.

The induced voltage coefficient $K_e^*$ 81 of permanent magnet motor 1 and the magnetic flux gain $G_d$ ($\theta_{dc}$) of the d-axis are input to multiplier 87.

The output of multiplier 87 is input to multiplier 88 together with frequency estimate $\omega_{dc}$.

The output of multiplier 88 is the q-axis induced voltage command value $e_{qc}^*$ shown in Formula 7.

Here, frequency estimates $\omega_{dc}$ is used as the input of multiplier 88, but it can be modified so that frequency command value $\omega_r^*$ is used as the input of multiplier 88 instead of frequency estimates $\omega_{dc}$ and multiplied with the output of multiplier 87.

[Formula 7]

$$e_{qc}^* = \omega_{dc} K_e^* G_d(\theta_{dc}) \quad (7)$$

In addition, the calculation section 86 calculates the electrical circuit parameters of the permanent magnet motor 1 of winding resistance setting $R^*$, d-axis inductance setting $L_d^*$, d-axis current command value $i_d^*$, q-axis current command value $i_q^*$, frequency estimates $\omega_{dc}$ are used to calculate the q-axis voltage command value $v_{qc0}^*$ according to Formula 8.

The output $v_{qc0}^*$ of arithmetic unit 86 is input to adder 89 together with the q-axis induced voltage command value $e_{qc}^*$. The output of adder 89 is the reference value $v_{qc}^*$ of the q-axis voltage command value shown in Formula 9.

[Equation 8]

$$v_{qc0}^* = R^* i_q^* + \omega_{dc} L_d^* \frac{1}{1 + T_{acr}s} i_d^* \quad (8)$$

[Formula 9]

$$v_{qc}^* = v_{qc0}^* + e_{qc}^* \quad (9)$$

Third, the current control operation of the vector control is explained. d-axis and q-axis voltage correction values $\Delta v_{dc}$ and $\Delta v_{qc}$ are calculated according to Formula 10 by proportional control and integral control so that the current sense values $i_{dc}$ and $i_{qc}$ of each component follow the current command values $i_d^*$ and $i_q^*$ of the d and q axes, respectively.

[Fromula 10]

$$\begin{bmatrix} \Delta v_{dc} = \left(K_{pd} + \frac{K_{id}}{s}\right)(i_d^* - i_{dc}) \\ \Delta v_{qc} = \left(K_{pq} + \frac{K_{iq}}{s}\right)(i_q^* - i_{qc}) \end{bmatrix} \quad (10)$$

WHEREAS, $K_{pd}$: proportional gain of current control of d-axis, $K_{id}$: integral gain of current control of d-axis $K_{pq}$: proportional gain of q-axis current control, $K_{iq}$: integral gain of q-axis current control In addition, the d-axis and q-axis voltage command value $v_{dc}^{}$ and $v_{qc}^{}$ are calculated according to Formula 11.

[Fromula 11]

$$\begin{bmatrix} v_{dc}^{**} = v_{dc}^* + \Delta v_{dc} \\ v_{qc}^{**} = v_{qc}^* + \Delta v_{qc} \end{bmatrix} \quad (11)$$

The phase error estimation unit 9 calculates the phase error estimates $\Delta\theta$ based on the d-axis and q-axis voltage command value $v_{dc}^{}$, $v_{qc}^{}$, current sense value $i_{dc}$, $i_{qc}$ and the electrical circuit parameters of magnet motor 1 ($R^*$, $L_q^*$), frequency estimation $\omega_{dc}$ and the extended induced voltage formula (Formula 12).

[Formula 12]

$$\Delta\theta c = \tan^{-1}\left(\frac{v_{dc}^{**} - R^* i_{dc} + \omega_{dc} L_q^* i_{qc}}{v_{qc}^{**} - R^* i_{qc} - \omega_{dc} L_q^* i_{dc}}\right) \quad (12)$$

Frequency and phase estimation 10 will be described.

To make the phase error estimates $\Delta\theta_c$ follow the command value $\Delta\theta_c^*$, frequency estimates $\omega_{dc}$ are calculated according to Formula 13 by P(proportional)+I(integral) control operation, and phase estimates value $\theta_{dc}$ are calculated according to Formula 14 by I control operation.

[Formula 13]

$$\omega_{dc} = \left(Kp_{pll} + \frac{Ki_{pll}}{s}\right)(\Delta\theta_c^* - \Delta\theta_c) \quad (13)$$

WHEREAS, $Kp_{pll}$: proportional gain of PLL control, $Ki_{pll}$: integral gain of PLL control

[Formula 14]

$$\theta dc = \frac{1}{s} \cdot \omega_{dc} \quad (14)$$

The principle of the sinusoidal motor current in the present invention is explained next.

Figure 4:
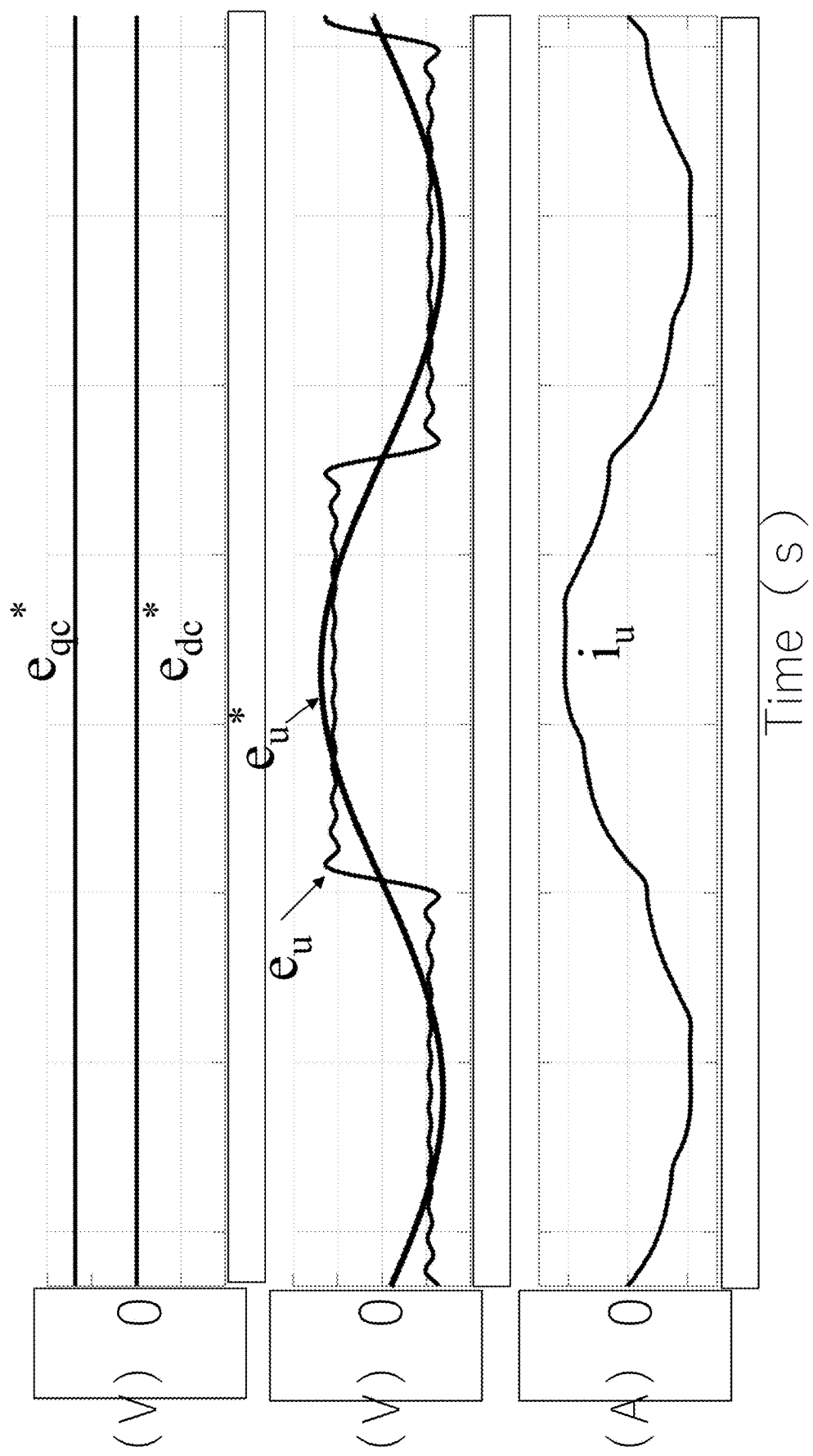
FIG. 4: Control characteristics 1.

FIG. 4 shows control characteristic 1 when the d-axis and q-axis magnetic flux gains are $G_q$ ($\theta_{dc}$)=0 and $G_d$ ($\theta_{dc}$)=1, respectively. This is the simulation result of driving magnet motor 1 with square wave induced voltage.

In FIG. 4, the upper row displays the d-axis and q-axis induced voltage command value $e_{dc}^*$ and $e_{qc}^*$, the middle row displays the square wave induced voltage $e_u$ of phase u and the command value equivalent $e_u^*$ of the induced voltage of phase u, and the lower row displays the alternating current $i_u$ of phase u. Since $G_q$ ($\theta_{dc}$)=0 and $G_d$ ($\theta_{dc}$)=1 the d-axis and q-axis induced voltage command values $e_{dc}^*$ and $e_{qc}^*$ are Formula 15 and $e_u^*$ is a sine wave.

[Formula 15]

$$\begin{matrix} e_{dc}^* = 0.0 \\ e_{qc}^* = \omega_{dc} K_e^* \end{matrix} \quad (15)$$

As a result, the alternating current $i_u$ of phase u is not a sinusoidal current, but a distorted current with superimposed 5th and 7th harmonics.

Figure 5:
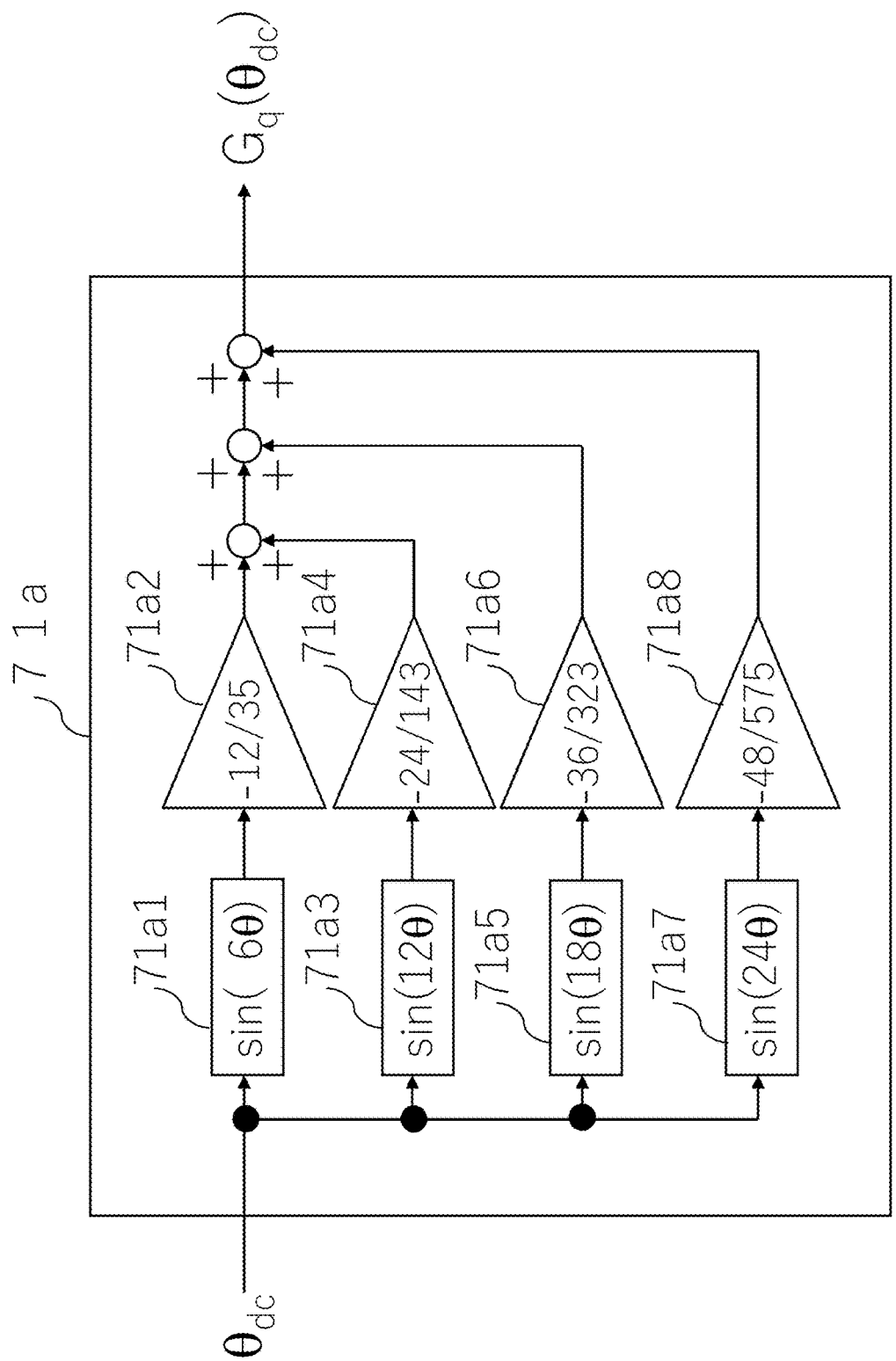
FIG. 5: Configuration diagram of the q-axis magnetic flux gain calculation unit (N=4) in the example.

In using the magnetic flux gain calculation unit 7 of the present invention, the order N shown in Formula 2 is set to 4, for example. FIG. 5 shows the block (compensation up to the 24th harmonic) of the q-axis magnetic flux gain calculation unit 71a with N=4.

The phase of n=1 is calculated by 71a1 and the magnetic flux gain is calculated by 71a2. n=2 is calculated by 71a3 and the magnetic flux gain is calculated by 71a4. n=3 is calculated by 71a5 and the magnetic flux gain is calculated by 71a6. The phase of n=4 is calculated by 71a7 and the magnetic flux gain is calculated by 71a8. These are uniquely determined, and the signal obtained by adding the results of operations n=1 to n=4 is $G_q(\theta_{dc})$.

Figure 6:
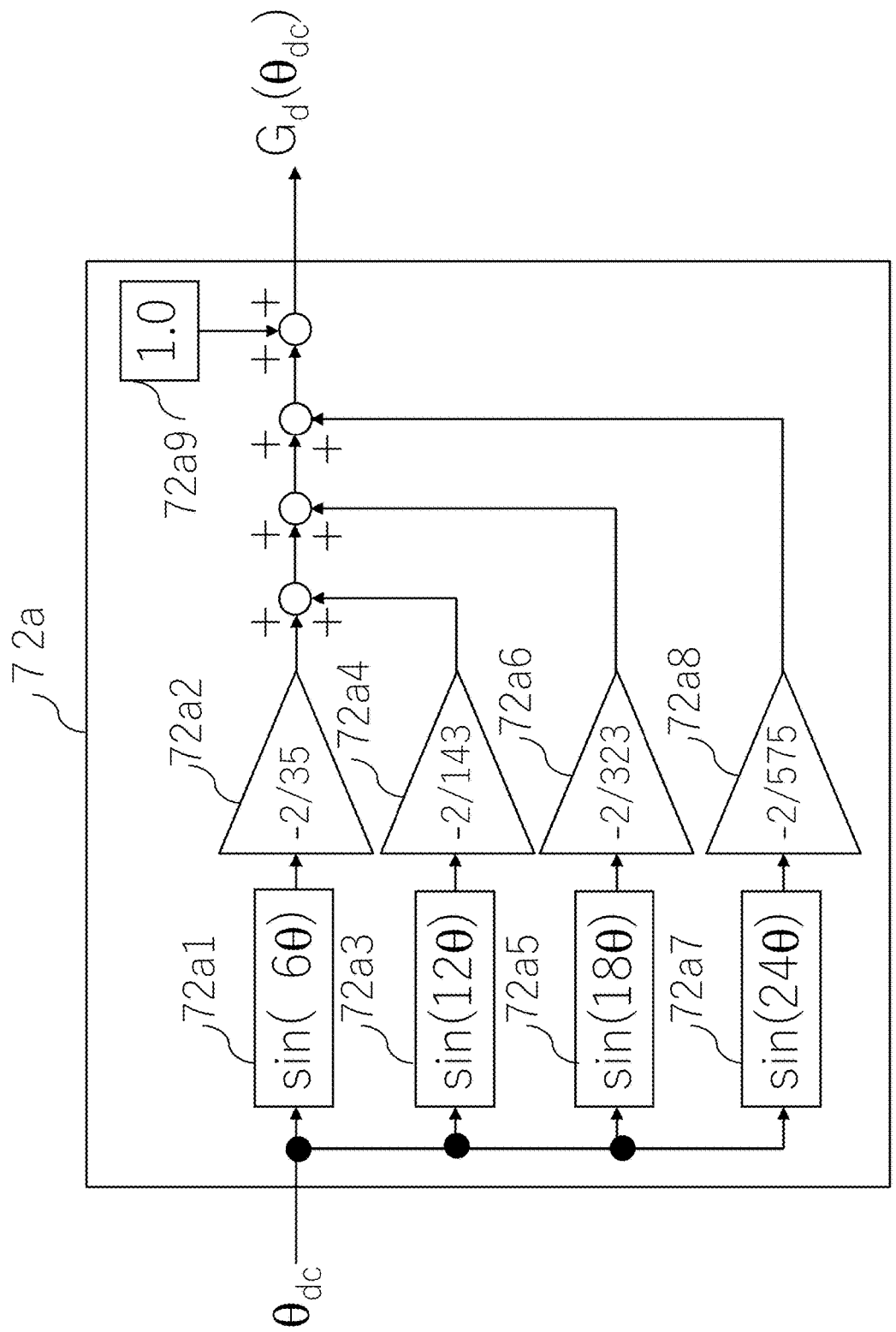
FIG. 6: Configuration diagram of the magnetic flux gain calculation unit (N=4) for the d-axis in Example 1.

Next, set N=4 as shown in Formula 3. FIG. 6 shows the block diagram (compensation up to the 24th harmonic) of the d-axis magnetic flux gain calculation unit 72a set to N=4.

The phase of n=1 is calculated by 72a1 and the magnetic flux gain is calculated by 72a2. n=2 is calculated by 72a3 and the magnetic flux gain is calculated by 72a4. n=3 is calculated by 72a5 and the magnetic flux gain is calculated by 72a6. The phase of n=4 is calculated by 72a7 and the magnetic flux gain is calculated by 72a8. The constant "1" is set in the setting section 72a9. n=1 to n=4 and the constant "1" are added to obtain the signal $G_d(\theta_{dc})$.

Figure 7:
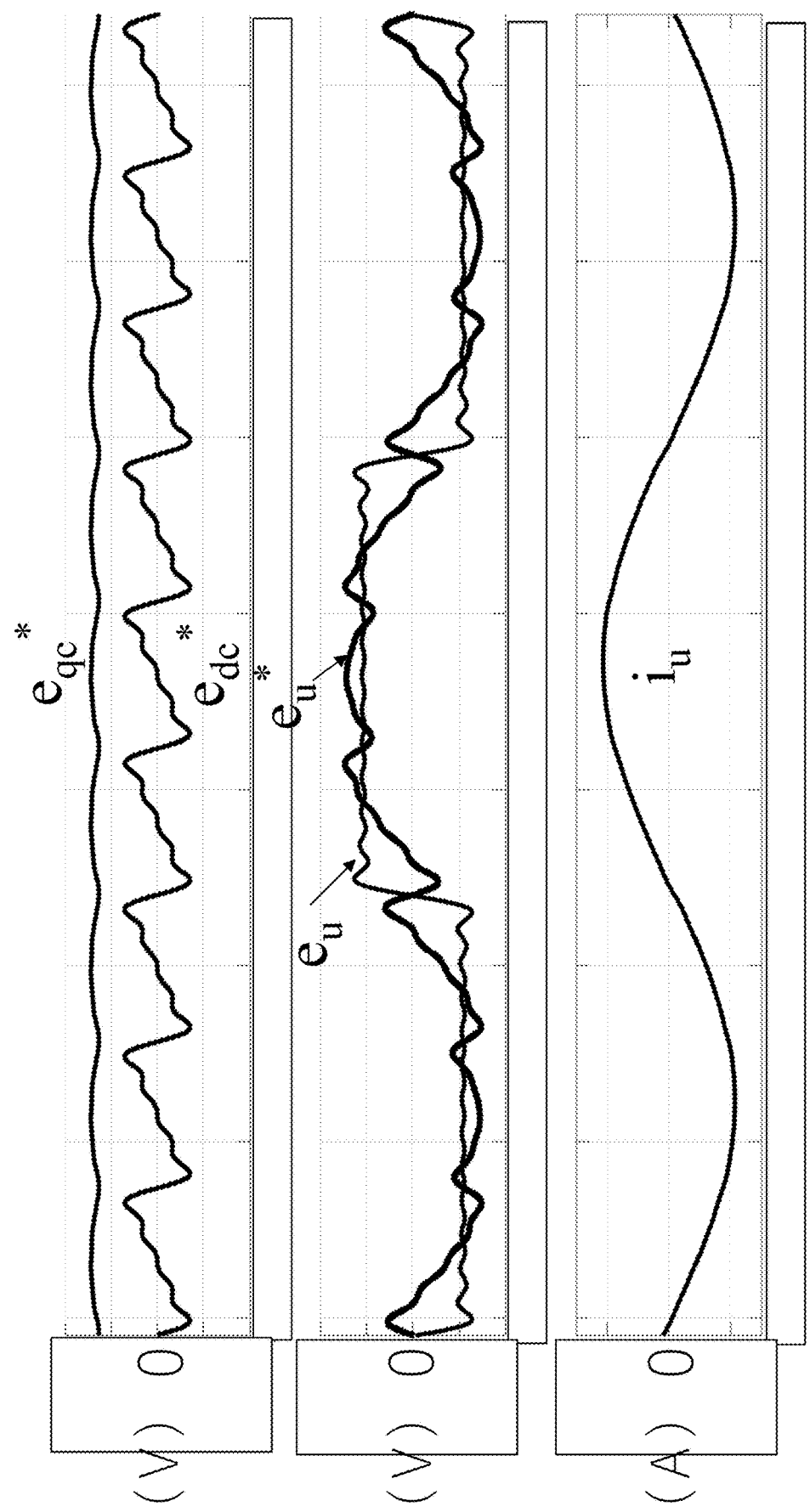
FIG. 7: Control characteristics 2.

FIG. 7 shows the control characteristics 2 when magnetic flux gain calculation unit 7 is used (N=4 is used). This is the simulation result of driving magnet motor 1 whose induced voltage is a square wave.

In FIG. 7, the top row shows the d-axis and q-axis induced voltage command value $e_{dc}^*$ and $e_{qc}^*$, the middle row shows the square wave induced voltage $e_u$ of phase u and the command value equivalent $e_u^*$ of the induced voltage of phase u, and the bottom row shows the alternating current $i_u$ of phase u.

$G_q(\theta_{dc})$ is shown the block diagram in FIG. 5, $G_d(\theta_{dc})$ shown in the block diagram in FIG. 6.

The d-axis and q-axis induced voltage command values $e_{dc}^*$ and $e_{qc}^*$ include up to 24th harmonic components, and the induced voltage command value equivalent $e_u^*$ is a waveform far from a sine wave containing harmonics, but the alternating current $i_u$ is a sinusoidal current.

The effect of the invention is evident. In the case of FIG. 4, the d-axis induced voltage command value $e_{dc}^*$ is zero, but the d-axis induced voltage command value $e_{dc}^*$ is not zero as in FIG. 4, but has a shape that includes harmonic components (sawtooth wave). This is one of the characteristics.

Figure 8:
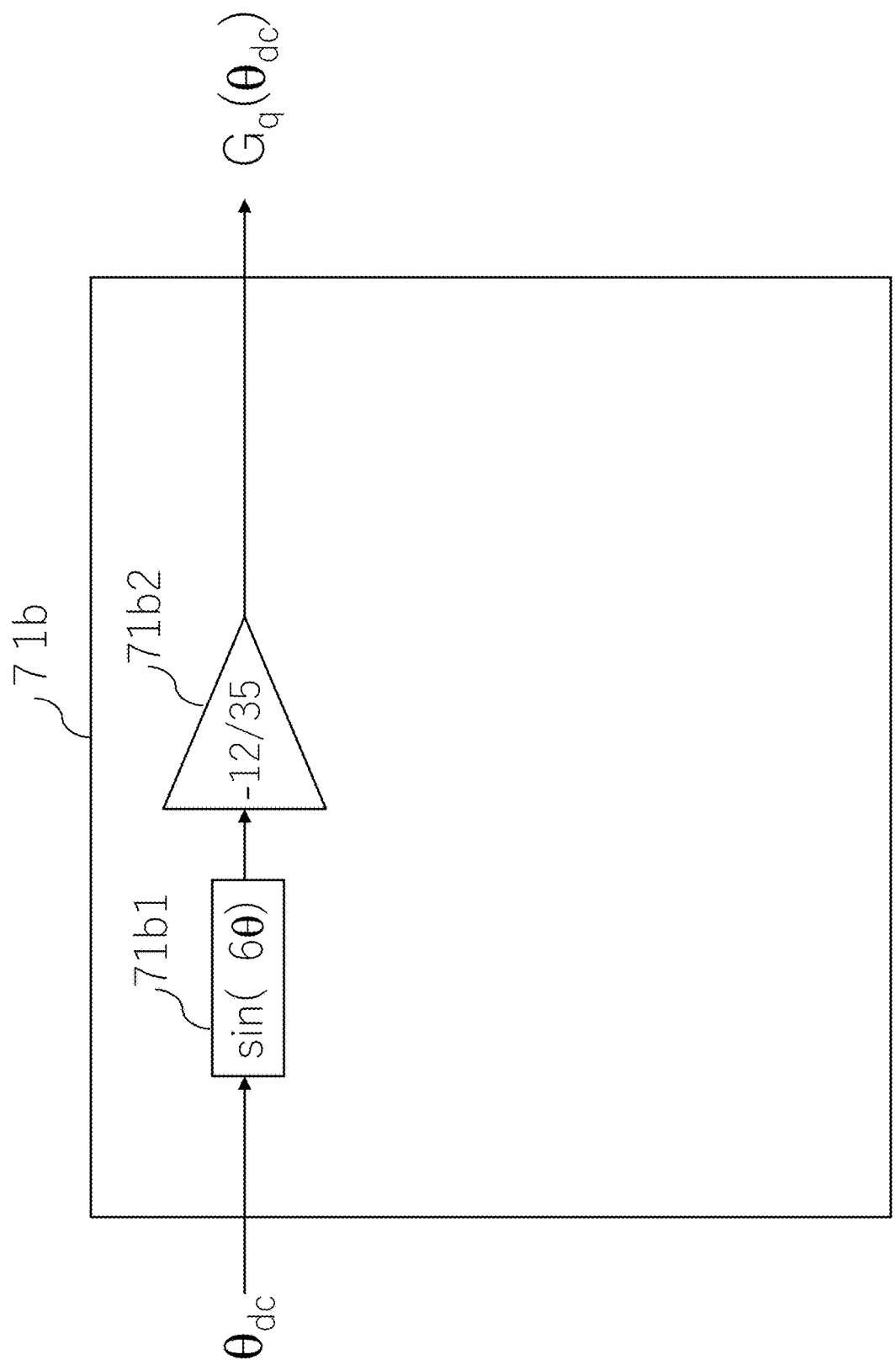
FIG. 8: Configuration diagram of the q-axis magnetic flux gain calculation unit (N=1) in Example 1.

Furthermore, set N=1 in the magnetic flux gain calculation unit 7 in FIG. 1. (In Formula 2, set N=1. FIG. 8 shows the block of magnetic flux gain calculation unit 71b for the q-axis set to N=1 (compensation of 6th harmonic). n=1 phase is calculated in calculation unit 71b1 and magnetic flux gain is calculated in calculation unit 71b2. The signal is $G_q(\theta_{dc})$.

Figure 9:
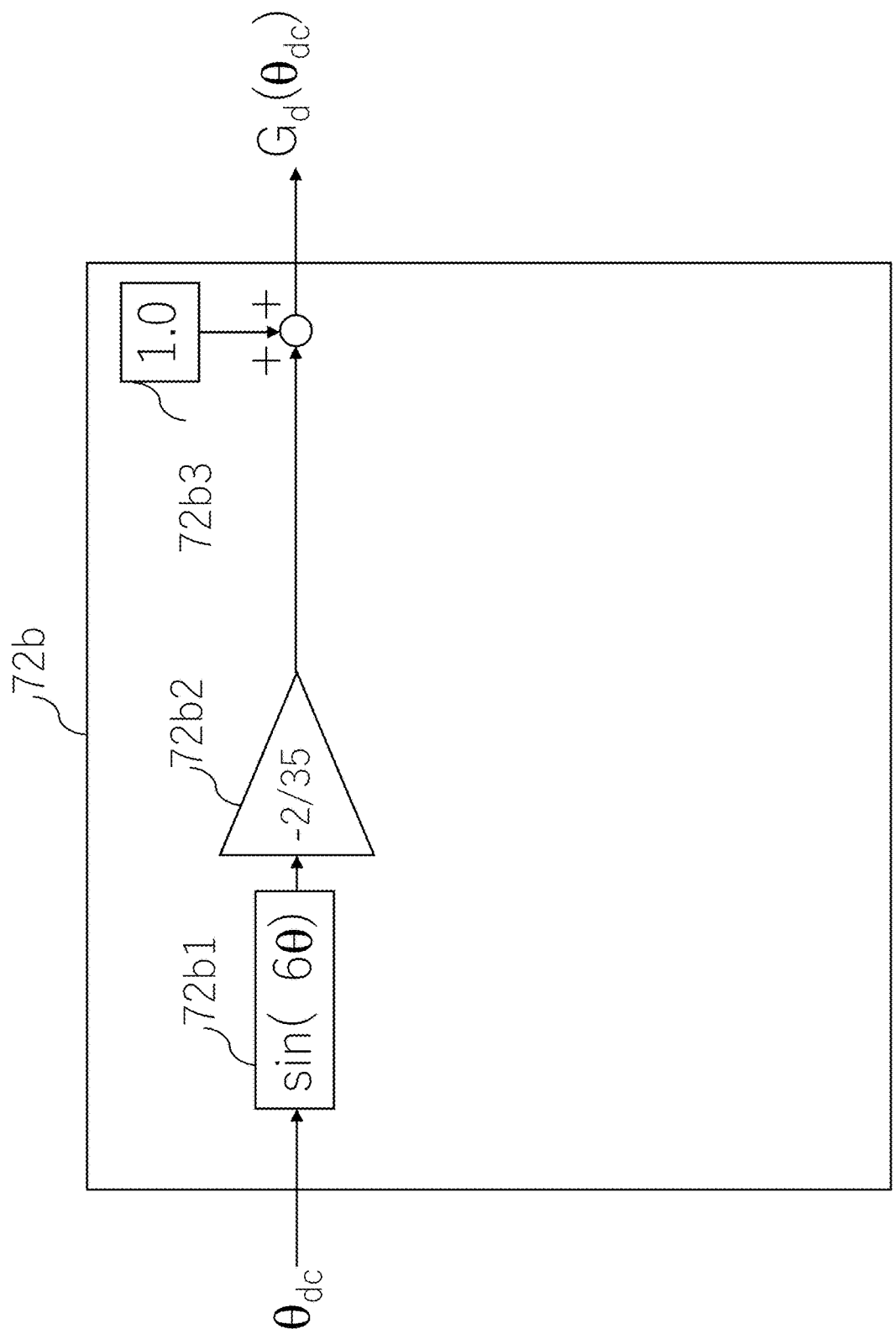
FIG. 9: Configuration diagram of the magnetic flux gain calculation unit (N=1) for the d-axis in Example 1.

Next, set N=1 in Formula 3. FIG. 9 shows the block of the magnetic flux gain calculation unit 72b for the d-axis set to N=1 (compensation of 6th harmonic). n=1 phase is calculated in calculation unit 72b1 and magnetic flux gain in calculation unit 72b2. The constant "1" is set in the setting unit 72b3. The additive signal with constant "1" and n=1 is $G_d(\theta_{dc})$.

Figure 10:
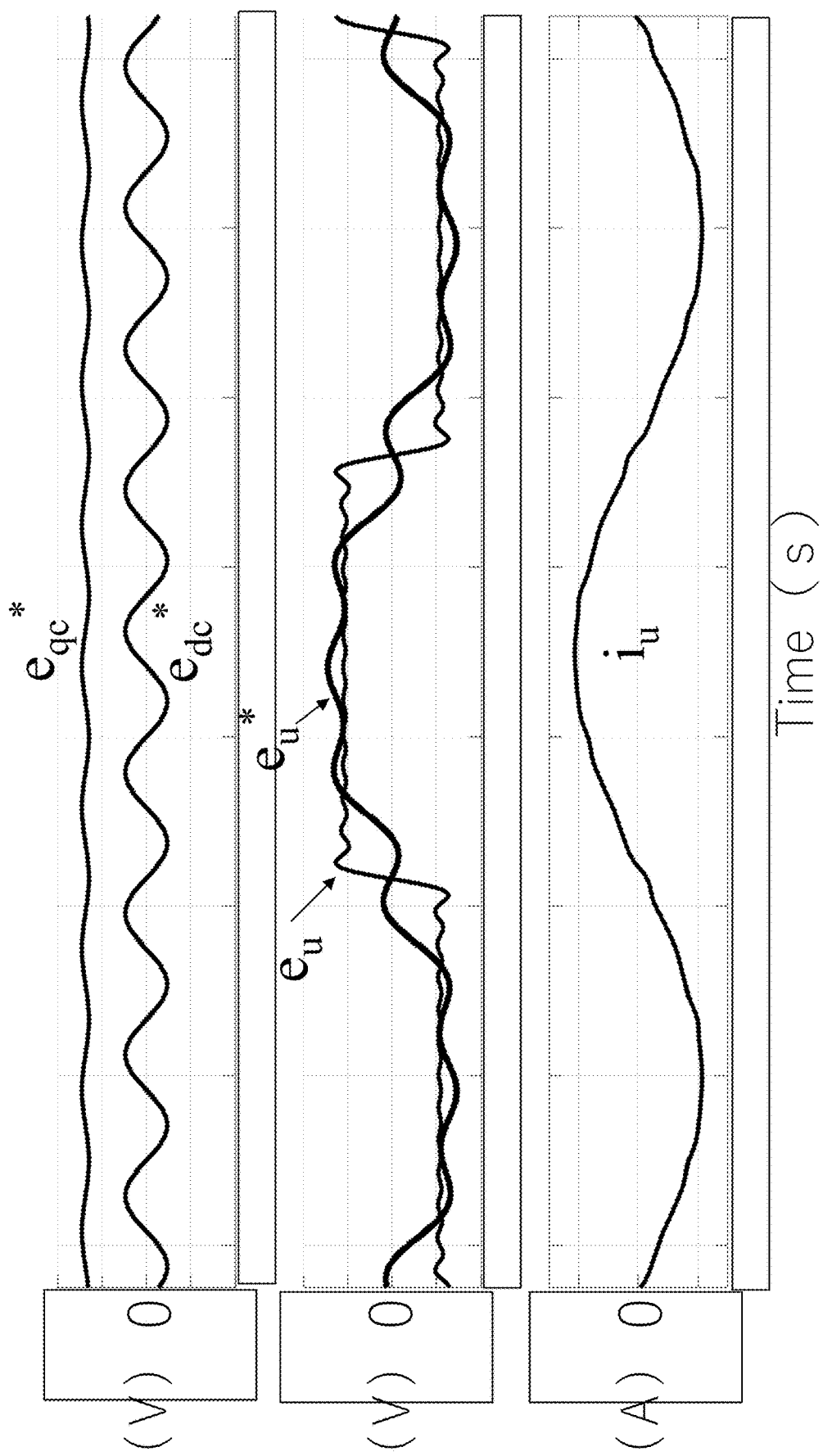
FIG. 10: Control characteristic 3.

FIG. 10 shows the control characteristics 3 when the magnetic flux gain calculation unit 7 is used (N=1 is used). This is the simulation result of driving magnet motor 1 whose induced voltage is a square wave.

In FIG. 10, the upper row displays the d-axis and q-axis induced voltage command values $e_{dc}^*$ and $e_{qc}^*$, the middle row displays the square wave induced voltage of phase u $e_u$ and the command value equivalent $e_u^*$ of the induced voltage of phase u, and the lower row displays the alternating current $i_u$ of phase u. $G_q(\theta_{dc})$ is the block diagram in FIG. 8, $G_d(\theta_{dc})$ is the case of the calculation in the block diagram in FIG. 9.

The d-axis and q-axis induced voltage command values $e_{dc}^*$ and $e_{qc}^*$ contain 6th harmonic components, and the induced voltage command value equivalent $e_u^*$ is far from a sinusoidal waveform, but the alternating current $i_u$ of phase u is somewhat distorted compared to a sinusoidal waveform. The effect of this invention is obvious. To confirm the effect of this example, the order N was set to N=4 and N=1 as an example. N is a natural number, and the larger the value of N, the closer the alternating current of the u-phase can be to a sine wave.

According to this example, the current of magnet motor can be made sinusoidal without having induced voltage data by a general-purpose controller or other means.

Figure 11:
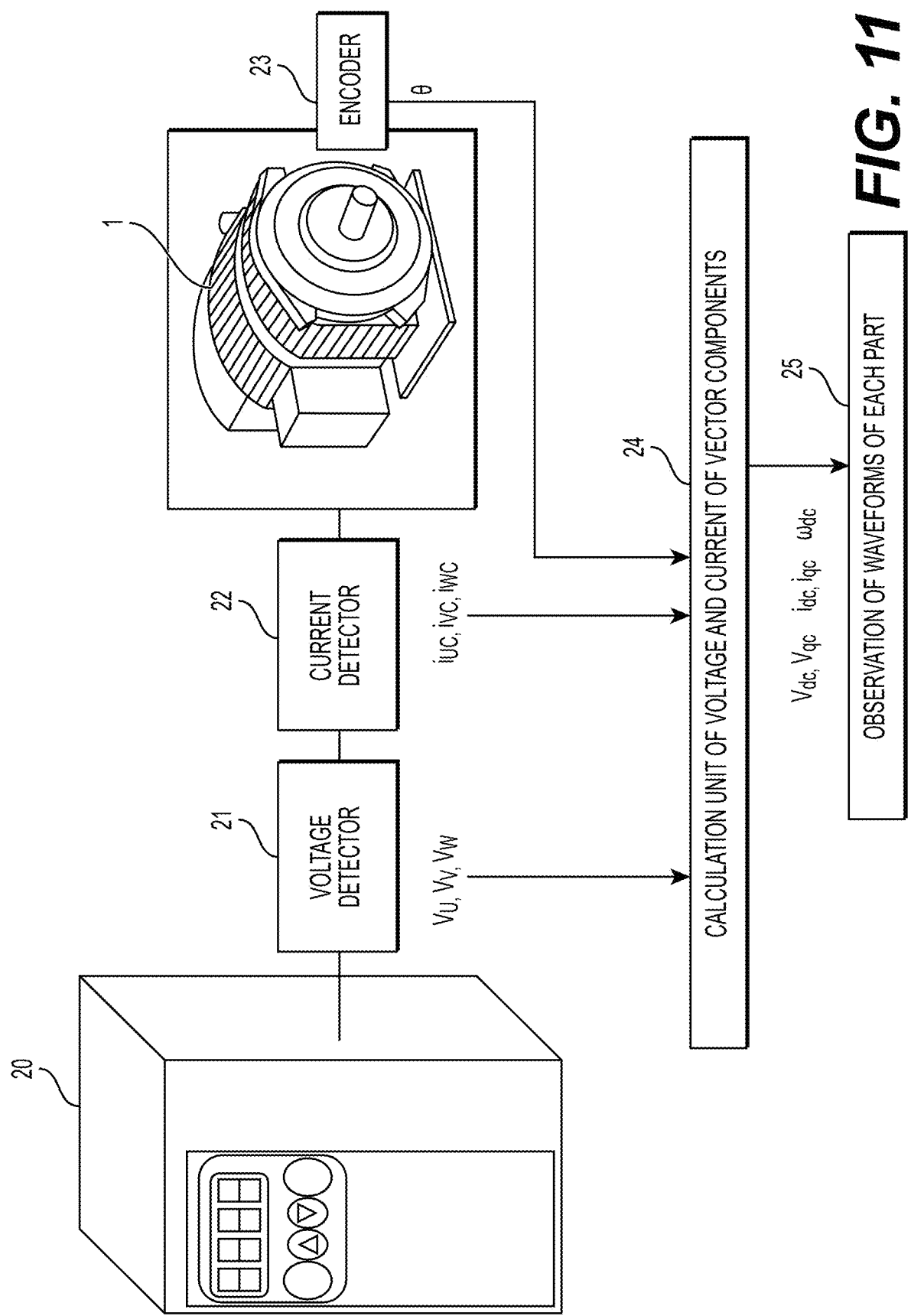
FIG. 11: Configuration diagram for checking the manifestation of the invention.

Here, the verification method when this example is adopted is explained using FIG. 11. voltage detector 21 and current detector 22 are attached to the power converter apparatus 20 that drives magnet motor 1, and encoder 23 is attached to the shaft of magnet encoder 23 is attached to the shaft of magnet motor 1.

The voltage detection values of 3-phase AC ($v_{uc}$, $v_{vc}$, $v_{wc}$) and current sense values of 3-phase AC ($i_{uc}$, $i_{vc}$, $i_{wc}$) which are outputs of voltage detector 21, and the position detection values $\theta$, which are outputs of encoder, are input to the calculation section 24 for vector voltage and current components, $v_{dcc}$, $v_{qcc}$, $i_{dcc}$ and $i_{qcc}$ of the vector current components and the detected value $\omega_{rc}$, which is the derivative of position $\theta$, are calculated.

The observation section 25 of each part waveform calculates the d-axis and q-axis induced voltages $e_{dc}\hat{}$ and $e_{qc}\hat{}$ using Formula 16.

[Formula 16]

$$e_{dc}\hat{} = v_{dcc} - (Ri_{dcc} - \omega_{rc}L_q i_{qcc})$$

$$e_{qc}\hat{} = v_{qcc} - (Ri_{qcc} + \omega_{rc}L_d i_{dcc}) \quad (16)$$

By observing the voltage waveforms of $e_{dc}\hat{}$ and $e_{qc}\hat{}$, it is obvious that the invention has been adopted.

EXAMPLE 2

Figure 12:
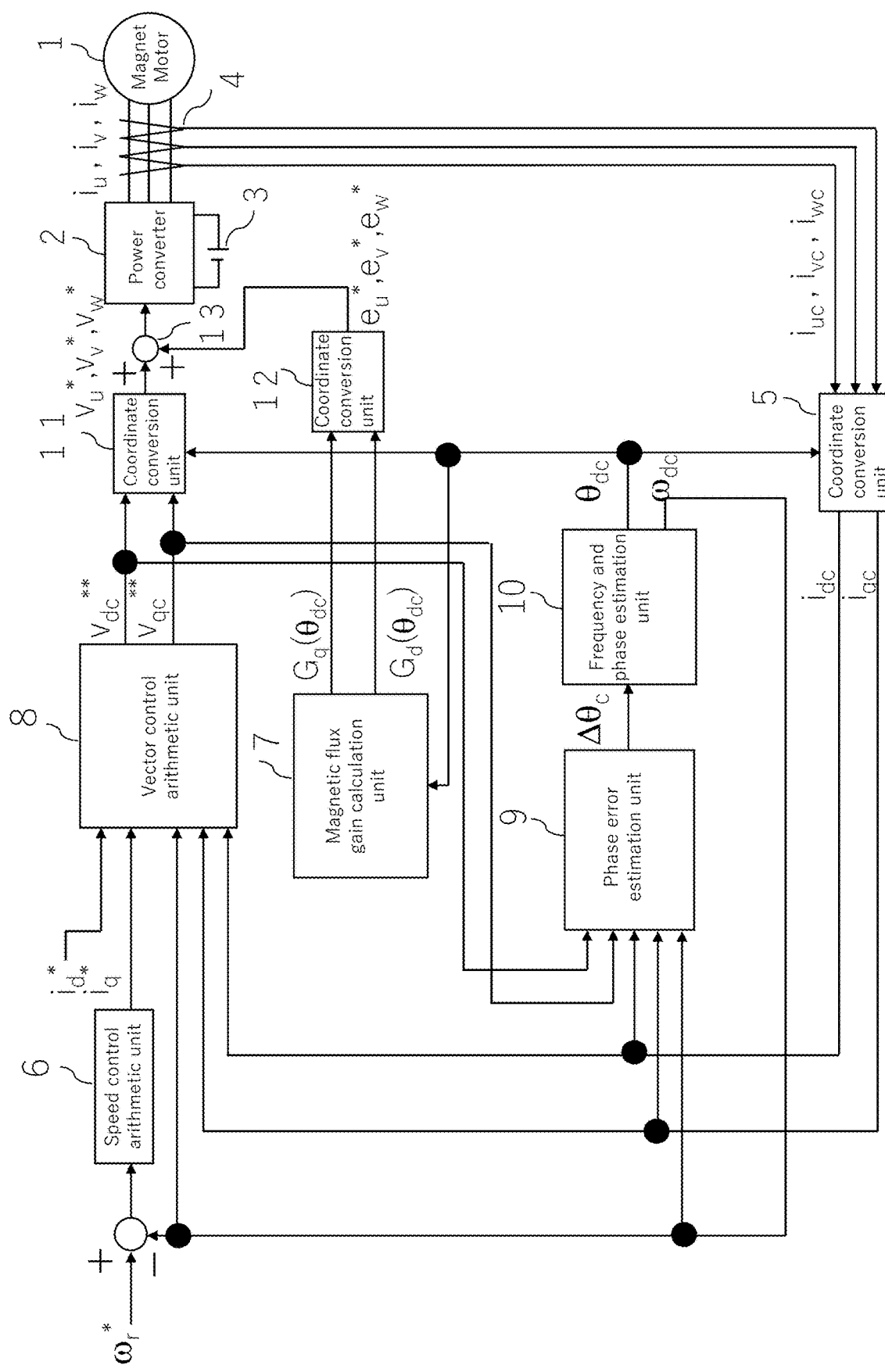
FIG. 12: System configuration diagram of the power converter apparatus and other equipment in Example 2.

FIG. 12 shows the system configuration diagram with power converter apparatus and magnet motor in Example 2.

While Example 1 modified the d-q-axis voltage command value of the rotary seat coordinates, this example modifies the U-V-W voltage command value of the fixed coordinates.

In FIG. 12, magnet motor 1, power converter 2, DC power supply 3, current detector 4, coordinate conversion unit 5, speed control arithmetic unit 6, magnetic flux gain calculation unit 7, phase error estimation unit 9, frequency and phase estimation 10, and coordinate conversion unit 11 are the same as in FIG. 1. The vector control arithmetic unit 8 in FIG. 3 without the induced voltage coefficients $K_e^*$ 81, multiplier 82, multiplier 83, adder 85, multiplier 87, multiplier 88, and adder 89 is shown in FIG. 12. FIG. 12 shows the vector control arithmetic unit 8.

12 is the coordinate conversion unit from rotational coordinates to fixed coordinates and 13 is the adder. Coordinate conversion unit 12 replaces the operations in vector control arithmetic unit 8 in FIG. 3. magnetic flux gain $G_q$ ($\theta_{dc}$) and d-axis magnetic flux gain $G_d$ ($\theta_{dc}$) to calculate the d-axis and q-axis induced voltage command values $e_{dc}{}^*$ and $e_{qc}{}^*$. Then, coordinate conversion unit 12 outputs three-phase induced voltage command values $e_u{}^*$, $e_v{}^*$, and $e_w{}^*$ from the d-axis and q-axis induced voltage command values $e_{dc}{}^*$, $e_{qc}{}^*$ and the phase estimate value $\theta_{dc}$.

In this example, the d-axis and q-axis induced voltage command values $e_{dc}{}^*$ and $e_{qc}{}^*$ are converted to 3-phase induced voltage command values $e_u{}^*$, $e_v{}^*$, and $e_w{}^*$ to modify the 3-phase voltage command values.

According to this example, a sinusoidal current can be realized as in Example 1.

EXAMPLE 3

Figure 13:
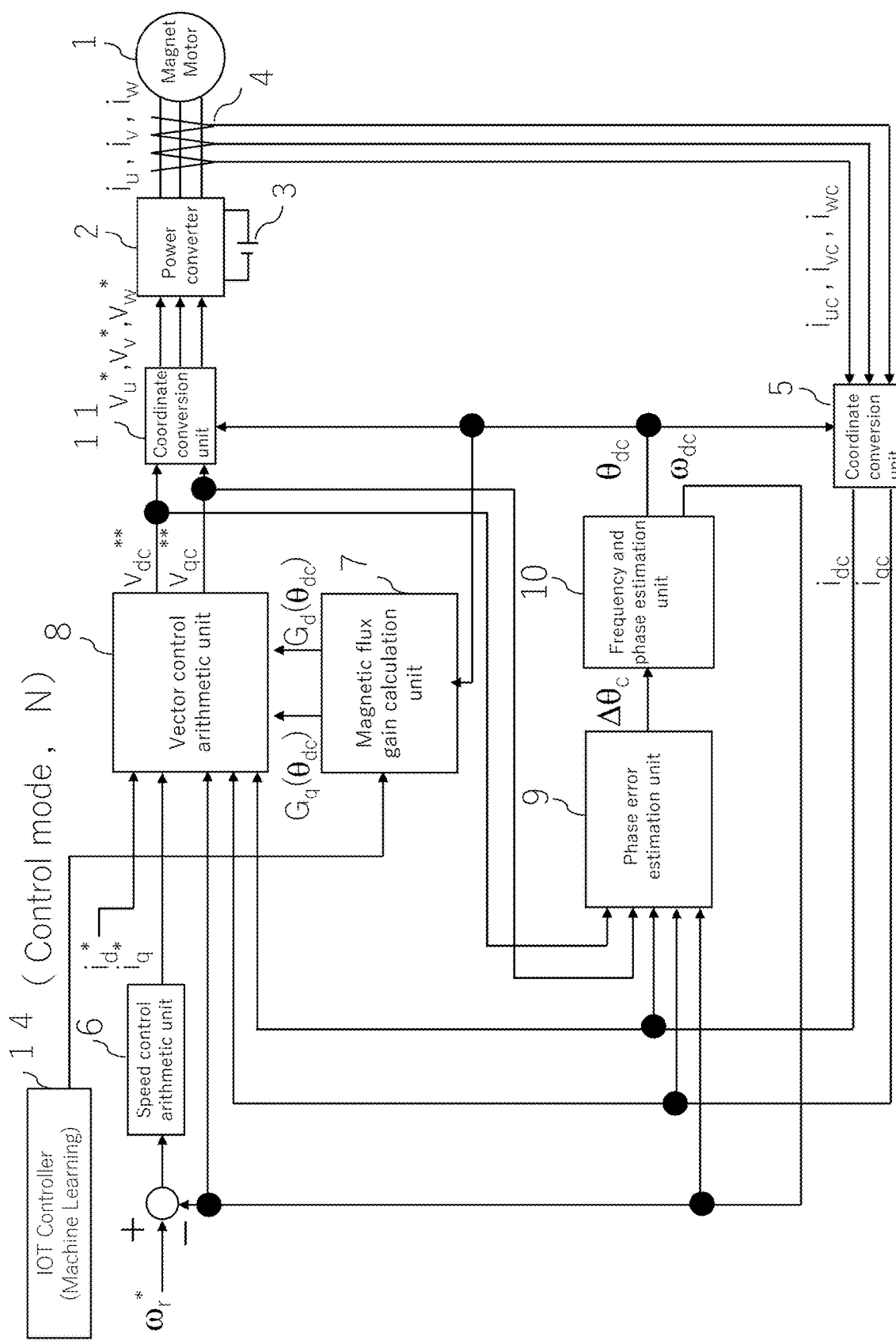
FIG. 13: System configuration diagram of the power converter apparatus and other equipment in Example 3.

FIG. 13 is a system configuration diagram with power converter apparatus and magnet motor in Example 3. In FIG. 13, magnet motor 1, power converter 2, DC power supply 3, current detector 4, coordinate conversion unit 5, speed control arithmetic unit 6, magnetic flux gain calculation unit 7, vector control arithmetic unit 8, phase error estimation unit 9, frequency and phase estimation 10, and coordinate conversion unit 11 is identical to FIG. 1. 14 is an IOT (Internet of Things) controller that can perform machine learning.

Example 1 is a configuration in which the drive mode (square wave drive or sine wave drive) and parameters such as the order N of Formula 2 or Formula 3 are set in the controller (microcomputer or other control unit) of the power converter.

When the control unit in Example 3 receives an instruction for sinusoidal drive, it sets the gain of the q-axis flux component to 0 and the gain of the d-axis flux component to 1.

When a square wave drive instruction is received, the control unit calculates the gain of said magnetic flux component of the q-axis as a sine function of the phase estimate based on Formula 2. Furthermore, the control unit calculates the gain of the magnetic flux component of the d-axis as a sinusoidal function of the phase estimate based on Formula 3, and subtracts the result of the calculation from 1.

In this example, the control unit feeds back the voltage command value $v_{dc}{}^{}$, $v_{qc}{}^{}$ and current sense value $i_{dc}$, $i_{qc}$, phase error estimates $\Delta\theta_c$ to the upper IOT CONTROLLER 14. IOT CONTROLLER 14 analyzes the signals such as voltage command value $v_{dc}{}^{}$, $v_{qc}{}^{}$ and current sense value $i_{dc}$, $i_{qc}$, phase error estimates $\Delta\theta_c$ by machine learning, and based on the machine learning, the control unit re-sets the drive mode and order N to the power converter 2 controller.

According to this example, a sinusoidal current can be realized as in Example 1.

Example 4

Figure 14:
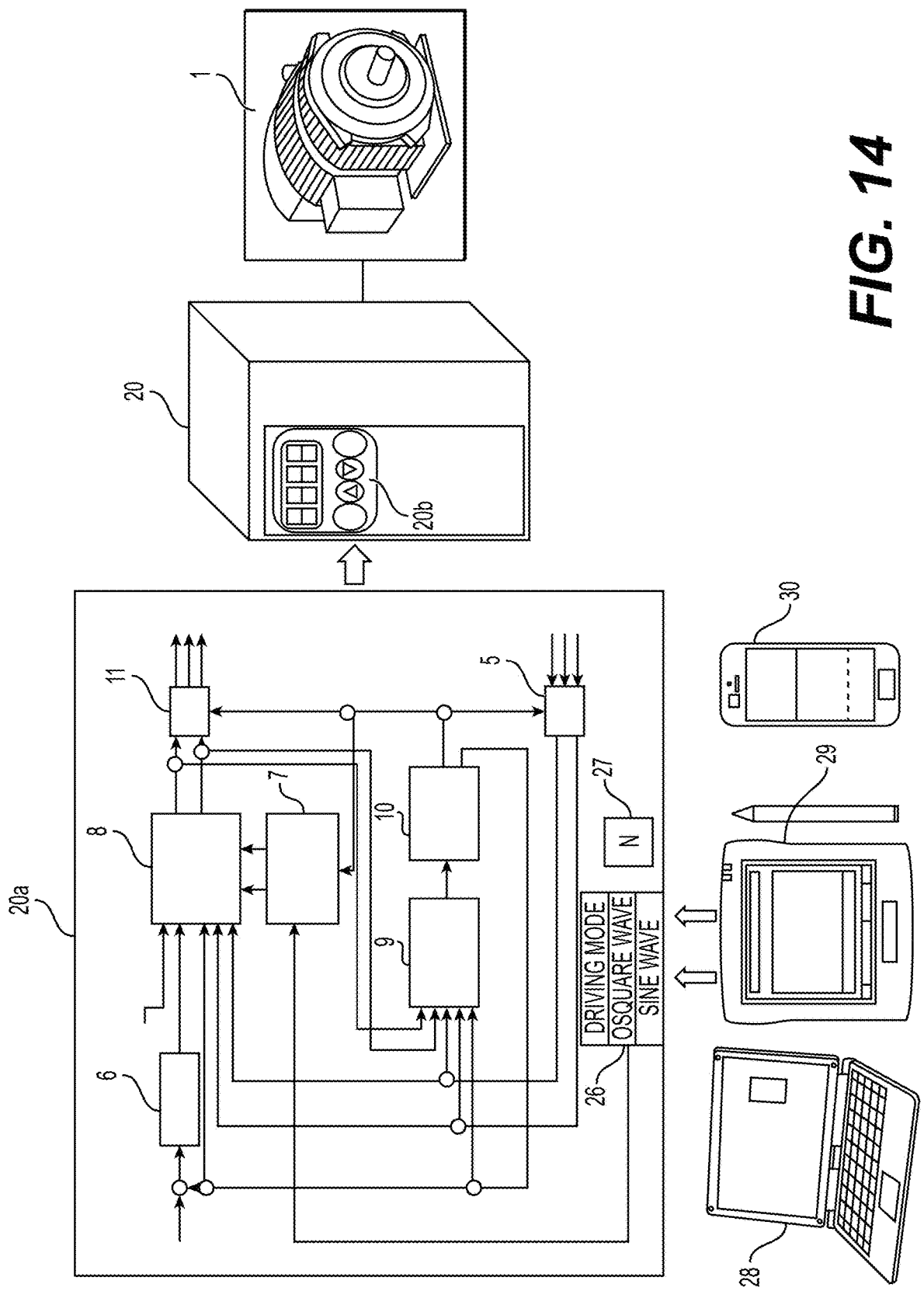
FIG. 14: System configuration diagram of the power converter apparatus and other equipment in Example 4.

FIG. 14 shows the system configuration diagram with power converter apparatus and magnet motor in Example 4.

This example is the application of this system to a magnet motor drive system.

In FIG. 14, the components magnet motor 1, coordinate conversion unit 5, speed control arithmetic unit 6, magnetic flux gain calculation unit 7, vector control arithmetic unit 8, phase error estimation unit 9, frequency and phase estimation 10, and coordinate conversion unit 11 are identical to those in FIG. 1.

Magnet motor 1, a component of FIG. 1, is driven by power converter apparatus 20. Power converter apparatus 20 consists of coordinate conversion unit 5, speed control arithmetic unit 6, magnetic flux gain calculation unit 7, vector control arithmetic unit 8, vector control arithmetic unit 8, phase error estimation unit 9, frequency and phase estimation unit 10, and magnetic flux gain calculation unit 11. arithmetic unit 6, magnetic flux gain calculation unit 7, vector control arithmetic unit 8, phase error estimation unit 9, frequency and phase estimation 10 and coordinate conversion unit 11 are implemented as software 20a. The power converter apparatus 20 has the power converter 2, DC power supply 3, and current detector 4 of FIG. 1 implemented as hardware.

From the display screen of a higher-level device such as a digital operator 20b, personal computers 28, tablets 29, smartphones 30, etc., the "drive mode" 26 to set the square wave drive or sinusoidal drive of software 20a, Formula 2 and Formula 3, the "order N 27" can be set and changed.

If this example is applied to a magnet motor drive system, the current of magnet motor, which is a square wave induced voltage, can be controlled sinusoidally. The "drive mode" and "N" may be set on a field bus such as a programmable logic controller, a local area network connected to a computer, or an IOT CONTROLLER.

The calculation results in the calculation sections 71a2, 71a4, 71a6, 71a8 of the magnetic flux gain in FIG. 5 and the calculation sections 72a2, 72a4, 72a6, 72a8 in FIG. 6 in Example 1 are constants, but these constants may be rewritten.

So far, in Examples 1 through 4, we have applied this method to position sensor-less control, but it can also be applied to vector control with an encoder attached to the shaft axis of magnet motor 1.

Furthermore, in Examples 1 through 4, voltage correction values $\Delta v_{dc}$ and $\Delta v_{qc}$ were created from current command value $i_d{}^*$, $i_q{}^*$ and current sense value $i_{dc}$, $i_{qc}$, and the operation shown in Formula 11 was performed to add this voltage correction value and the voltage reference value for vector control. Not only that, from current command value $i_d{}^*$, $i_q{}^*$ and current sense value $i_{dc}$, $i_{qc}$, the intermediate current command value $i_d{}^{}$, $i_q{}^{}$ shown in Formula 17 used for vector control calculation were created, and frequency estimates $\omega_{dc}$ and the vector control operation shown in Formula 18 may be performed using the electrical circuit parameters of magnet motor 1.

[Formula 17]

$$i_d^{**} = (K_{pd1} + \frac{K_{id1}}{s})(i_d^* - i_{dc}) \quad (17)$$

$$i_q^{**} = (K_{pq1} + \frac{K_{iq1}}{s})(i_q^* - i_{qc})$$

[Formula 18]

$$\begin{bmatrix} v_{dc}^{***} = R^* i_d^{**} - \omega_{dc} L_q^* \frac{1}{1+T_q s} i_q^{} \\ v_{qc}^{*} = R^* i_q^{**} + \omega_{dc} L_d^* \frac{1}{1+T_d s} i_d^{} + \omega_{dc} K e^{} \end{bmatrix} \quad (18)$$

WHEREAS, $K_{pd1}$: proportional gain of current control of $d_c$ axis, $K_{id1}$: integral gain of current control of $d_c$ axis, $K_{pq1}$: proportional gain of current control of $q_c$ axis, $K_{iq1}$: integral gain of current control of $q_c$ axis, $T_d$: electrical time constant of d axis ($L_d/R$), $T_q$: electrical time constant of q axis ($L_q/R$)

Alternatively, from the current command value $i_d^*$ and $i_q^*$ and the current sense value $i_{dc}$ and $i_{qc}$, the voltage correction values $\Delta v_{d\_p}^*$ for the proportional component of d-axis, $\Delta v_{d\_i}^*$ for the integral component of d-axis, $\Delta v_{q\_p}^*$ for the proportional component of q-axis and the modified values $\Delta v_{q\_i}^*$ of the integral component of the q-axis are created using Formula 19.

Then, the vector control operation shown in Formula 20 using the frequency estimates $\omega_{dc}$ and the electrical circuit parameters of magnet motor 1 may be performed.

[Formula 19]

$$\begin{bmatrix} \Delta v_{d\_p}^* = K_{pd2}(i_d^* - i_{dc}) \\ \Delta v_{d\_i}^* = \frac{K_{id2}}{s}(i_d^* - i_{dc}) \\ \Delta v_{q\_p}^* = K_{pq2}(i_q^* - i_{qc}) \\ \Delta v_{q\_i}^* = \frac{K_{iq2}}{s}(i_q^* - i_{qc}) \end{bmatrix} \quad (19)$$

WHEREAS, $K_{pd2}$: proportional gain of d-axis current control, $K_{id2}$: integral gain of d-axis current control, $K_{pq2}$: proportional gain of q-axis current control, $K_{iq2}$: integral gain of q-axis current control

[Formula 20]

$$\begin{bmatrix} v_{dc}^{****} = (\Delta v_{d\_p}^* + \Delta v_{d\_i}^*) - \omega_{dc} \frac{L_q^*}{R^*} \Delta v_{q\_i}^* \\ v_{qc}^{****} = (\Delta v_{q\_p}^* + \Delta v_{q\_i}^*) + \omega_{dc} \frac{L_d^*}{R^*} \Delta v_{d\_i}^* + \omega_{dc} K_e^* \end{bmatrix} \quad (20)$$

The primary delay signal $i_{qctd}$ of the d-axis current command value $i_d^*$ and q-axis current sense value $i_{qc}$, frequency estimates $\omega_{dc}$ and the electrical circuit parameters of magnet motor 1 may be used to perform the vector control operation shown in Formula 21.

[Formula 21]

$$\begin{bmatrix} v_{dc}^{*****} = R^* i_d^* - \omega_{dc} L_q^* i_{qctd} \\ v_{qc}^{*****} = R^* i_{qctd} + \omega_{dc} L_d^* i_d^* + \omega_{dc} K e^{**} \end{bmatrix} \quad (21)$$

In Examples 1 to 4, the switching device that constitutes power converter 2 may be a Si(silicon) semiconductor device or a wide bandgap semiconductor device such as SiC(silicon carbide) or GaN(gallium nitride).

REFERENCE SIGNS LIST

1 . . . magnet motor
2 . . . power converter
3 . . . DC power supply
4 . . . current detector
5 . . . coordinate conversion unit
6 . . . speed control arithmetic unit
7 . . . magnetic flux gain calculation unit
8 . . . vector control arithmetic unit
9 . . . phase error estimation unit
10 . . . frequency and phase estimation
11 . . . coordinate conversion unit
12 . . . coordinate conversion unit
13 . . . Addition section, Adder
14 . . . IOT controller
20 . . . power converter apparatus
20a . . . power converter apparatus software
20b . . . digital operator of power converter apparatus
21 . . . voltage detector
22 . . . current detector
23 . . . encoder
24 . . . calculation part of vector current component
25 . . . observation of current waveforms of each part
26 . . . control mode
27 . . . N (degree)
28 . . . personal computers
29 . . . tablet
30 . . . smartphones
$i_d^*$ . . . d-axis current command value
$i_q^*$ . . . q-axis current command value
$\omega_r^*$ . . . frequency command value
$\omega_{dc}$ . . . frequency estimates
$\omega_r$ . . . magnet motor frequency
$G_q(\theta_{dc})$ . . . q-axis magnetic flux component gain
$G_d(\theta_{dc})$ . . . d-axis magnetic flux component gain
$e_{dc}^*$ . . . d-axis induced voltage command value
$e_{dc}^*$ . . . q-axis induced voltage command value
$v_{dc}^*$ $v_{dc}^{}$ $v_{dc}^{*}$ $v_{dc}^{**}$ $v_{dc}^{***}$ . . . d-axis voltage command value
$v_{qc}^*$ $v_{qc}^{}$ $v_{qc}^{*}$ $v_{qc}^{**}$ $v_{qc}^{***}$ . . . q-axis voltage command value
$\Delta\theta_c$ . . . phase error estimates

The invention claimed is:

1. A power converter apparatus comprising:
a power converter that outputs a signal to a magnet motor to vary an output frequency, output voltage and output current of the magnet motor,
a control unit controls the power converter,
wherein the control unit is configured to
calculate a gain of a magnetic flux component of a q-axis, which varies with a phase of the magnet motor,
calculate a d-axis induced voltage command value based on a value of an induced voltage coefficient, frequency estimates or frequency command value, and the gain of the magnetic flux component of the q-axis,
calculate a gain of a magnetic flux component of the d-axis, which varies with the phase of the magnet motor, and
calculate a q-axis induced voltage command value based on a set value of the induced voltage coefficient, frequency estimates or frequency command value, and the gain of the d-axis magnetic flux component,
receive instructions on whether the magnet motor is to be driven by a sinusoidal drive or a square wave drive,
when the instruction indicates the sinusoidal drive, the gain of the magnetic flux component of the q-axis is set to 0 and the gain of the magnetic flux component of the d-axis is set to 1,
when the instruction indicates the square wave drive,
obtain the gain of the magnetic flux component of the q-axis by computing as a sine function of a phase estimate value, and
obtain the gain of the magnetic flux component of the d-axis by computing as a sine function of a phase estimate value and subtracting a result of that calculation from 1.

2. The power converter apparatus according to claim 1, wherein the control unit is configured to calculate command values of induced voltages of three phases of the magnet motor based on a command value of induced voltages of the d-axis and the phase estimate value.

3. The power converter apparatus according to claim 1, wherein the control unit is configured to calculate command values of induced voltages of three phases of the magnet motor based on a command value of an induced voltage of the d-axis, command values of an induced voltage of the q-axis, and the phase estimate value.

4. The power converter apparatus according to claim 1, wherein the control unit is configured to calculate the gain of the magnetic flux component of the q-axis as a sine function of the phase estimate value.

5. The power converter apparatus according to claim 1, wherein the control unit is configured to calculate the gain of the magnetic flux component of the d-axis as a sine function of a phase estimate value,
and subtract a result from 1.

6. The power converter apparatus according to claim 1, wherein when the magnet motor is directed to select a square wave drive,
the control unit is configured to
select an order N in a sinusoidal function of the phase estimate value,
calculate the gain of the magnetic flux component in the q-axis and the gain of the magnetic flux component in the d-axis based on the order N.

7. The power converter apparatus according to claim 1, wherein the control unit is configured to
feed back a voltage command value, a current sense value, phase error estimates and an estimated frequency to a host device for analysis, and
automatically set an order N in a sinusoidal function of a phase estimate value required to calculate the gain of the magnetic flux component in the q-axis or the gain of the magnetic flux component in the d-axis, based on an analysis result from the host device.

8. The power converter apparatus according to claim 1, wherein the control unit is configured to
receive a direction of an order N in a sinusoidal function of a phase estimate required to calculate the gain of the magnetic flux component of the q-axis or the magnetic flux component of the d-axis,
determine whether the magnet motor is driven sinusoidally or via a square wave from digital operators or personal computers, and
control the magnet motor based on the direction.

* * * * *